United States Patent
Fisher-Jeffes et al.

(10) Patent No.: US 9,837,848 B2
(45) Date of Patent: Dec. 5, 2017

(54) FOREIGN-OBJECT DETECTION FOR RESONANT WIRELESS POWER SYSTEM

(71) Applicant: MediaTek Singapore Pte. Ltd., Singapore (SG)

(72) Inventors: Timothy Perrin Fisher-Jeffes, Cambridge, MA (US); William Plumb, Charlestown, MA (US); Patrick Stanley Riehl, Cambridge, MA (US); Anand Satyamoorthy, Somerville, MA (US)

(73) Assignee: MEDIATEK Singapore Pte. Ltd., Solaris (SG)

(*) Notice: Subject to any disclaimer, the term of this patent is extended or adjusted under 35 U.S.C. 154(b) by 58 days.

(21) Appl. No.: 14/771,568

(22) PCT Filed: Mar. 14, 2014

(86) PCT No.: PCT/US2014/026955
§ 371 (c)(1),
(2) Date: Aug. 31, 2015

(87) PCT Pub. No.: WO2014/152105
PCT Pub. Date: Sep. 25, 2014

(65) Prior Publication Data
US 2016/0028268 A1    Jan. 28, 2016

Related U.S. Application Data

(60) Provisional application No. 61/782,672, filed on Mar. 14, 2013.

(51) Int. Cl.
*H02J 17/00*    (2006.01)
*H02J 7/02*     (2016.01)
(Continued)

(52) U.S. Cl.
CPC ............ *H02J 7/025* (2013.01); *H02J 7/0021* (2013.01); *H02J 7/0027* (2013.01); *H02J 7/042* (2013.01);
(Continued)

(58) Field of Classification Search
USPC ........................................................ 320/108
See application file for complete search history.

(56) References Cited

U.S. PATENT DOCUMENTS

| | | |
|---|---|---|
| 2006/0113955 A1 | 6/2006 | Nunally |
| 2012/0244822 A1 | 9/2012 | Kim et al. |

(Continued)

FOREIGN PATENT DOCUMENTS

| | | |
|---|---|---|
| EP | 2490341 A2 | 8/2012 |
| WO | WO 2012/129273 A1 | 9/2012 |

OTHER PUBLICATIONS

Extended European Search Report for Application No. 14769408.7 dated Jul. 19, 2016.

(Continued)

*Primary Examiner* — Mohammed Alam
(74) *Attorney, Agent, or Firm* — Wolf, Greenfield & Sacks, P.C.

(57) ABSTRACT

A wireless charging system is provided that includes a charger portion that receives one or more portable elements for charging wirelessly. The charger portion controls the amount of power needed to charge the one or more portable elements. An inband communication module receives inband communications with the one or more portable elements using a random access mode. The charger portion utilizes the inband communications to determine how much power is needed, via energy based reporting, to charge the one or more portable elements that avoids conveying identification information.

10 Claims, 11 Drawing Sheets

(51) Int. Cl.
*H02J 7/00* (2006.01)
*H02J 7/04* (2006.01)
*H02J 50/80* (2016.01)
*H02J 50/60* (2016.01)

(52) U.S. Cl.
CPC .............. *H02J 17/00* (2013.01); *H02J 50/80* (2016.02); *H02J 50/60* (2016.02)

(56) References Cited

U.S. PATENT DOCUMENTS

| | | | |
|---|---|---|---|
| 2012/0280650 A1* | 11/2012 | Kim | H02J 17/00 320/108 |
| 2013/0026976 A1* | 1/2013 | Lu | H02J 7/0093 320/107 |
| 2013/0083722 A1* | 4/2013 | Bhargava | H04W 72/085 370/315 |
| 2014/0009110 A1 | 1/2014 | Lee et al. | |
| 2014/0084857 A1 | 3/2014 | Liu et al. | |
| 2014/0247004 A1* | 9/2014 | Kari | H02J 5/005 320/106 |
| 2015/0091496 A1* | 4/2015 | Meunier | H02J 7/025 320/106 |
| 2016/0028268 A1* | 1/2016 | Fisher-Jeffes | H02J 17/00 320/108 |
| 2016/0106370 A1* | 4/2016 | Filipovic | A61B 5/6898 340/870.07 |

OTHER PUBLICATIONS

International Search Report and Written Opinion for Application No. PCT/US14/26955 dated Jul. 28, 2014.
International Preliminary Report on Patentability for Application No. PCT/US14/26955 dated Sep. 24, 2015.

\* cited by examiner

FOREIGN-OBJECT DETECTION FOR RESONANT WIRELESS POWER SYSTEM

PRIORITY INFORMATION

This application is a National Phase Patent Application of PCT Application No. PCT/US2014/026955, filed on Mar. 14, 2014, which claims priority from provisional application Ser. No. 61/782,672 filed Mar. 14, 2013, which are incorporated herein by reference in their entirety.

BACKGROUND OF THE INVENTION

The invention is related to the field of wireless charger, and in particular to foreign-object detection for a resonant wireless power system.

Many electronic devices are designed to be small size, light weight and to have easy portability in order to comply with the users' requirements. Consequently, various portable electronic devices are produced by the manufacturers of the electronic devices. The common portable electronic devices include for example mobile phones, personal digital assistants (PDAs), handheld game consoles (e.g. PSP, NDSL and Gameboy series game consoles), and the like.

Due to the portability of the portable electronic device, the portable electronic device fails to be connected with the power source at any time. For providing electric power required for powering the portable electronic device, a built-in battery is usually installed in the portable electronic device. The battery is a chargeable battery. Once a power source is available, the chargeable battery of the portable electronic device may be charged by the power source as required.

For example, in a case that the residual battery capacity of the portable electronic device is insufficient, the chargeable battery of the portable electronic device may be charged by a charger. As known, conventional charger has a connecting wire. After the connecting wire is plugged in the portable electronic device and the conventional charger is connected with the power source, electric power may be transmitted from the charger to the portable electronic device through the connecting wire. However, the applications of the charger are usually restricted by the connecting wire. For example, during the process of charging the portable electronic device, the connecting wire usually becomes hindrance from operating the charger.

SUMMARY OF THE INVENTION

According to one aspect of the invention, there is provided a wireless charging system. The wireless charging system includes a charger portion that receives one or more portable elements for charging wirelessly. The charger portion controls the amount of power needed to charge the one or more portable elements. An inband communication module that receives communication from one or more portable elements using a random access mode. The charger portion utilizes the inband communications to determine how much power is needed, via energy based reporting, to charge the one or more portable elements that avoids conveying identification information.

According to another aspect of the invention, there is provided a method of performing wireless charging. The method includes providing one or more portable elements for charging wirelessly via a charger portion. The charger portion controls the amount of power needed to charge the one or more portable elements. Also, the method includes receiving inband communications from one or more portable elements using a random access mode via an inband communication module. The charger portion utilizes the inband communications to determine how much power is needed, via energy based reporting, to charge the one or more portable elements that avoids conveying identification information.

DETAILED DESCRIPTION OF THE INVENTION

The invention provides the feasibility of using the wireless charging medium to send messages from a charging device to the source for the purpose of power management without the need for the charging device to provide message acknowledgements or to convey a unique identifier, implicit or explicit, either via registration or by some other mechanism. Wireless charging is when energy is transferred from a Source to a Load without a physical connection. A typical example in this case would be a pad that's sits on a flat surface acting as the Source and a mobile phone placed on or near the pad acting as the Load.

Figure 1:
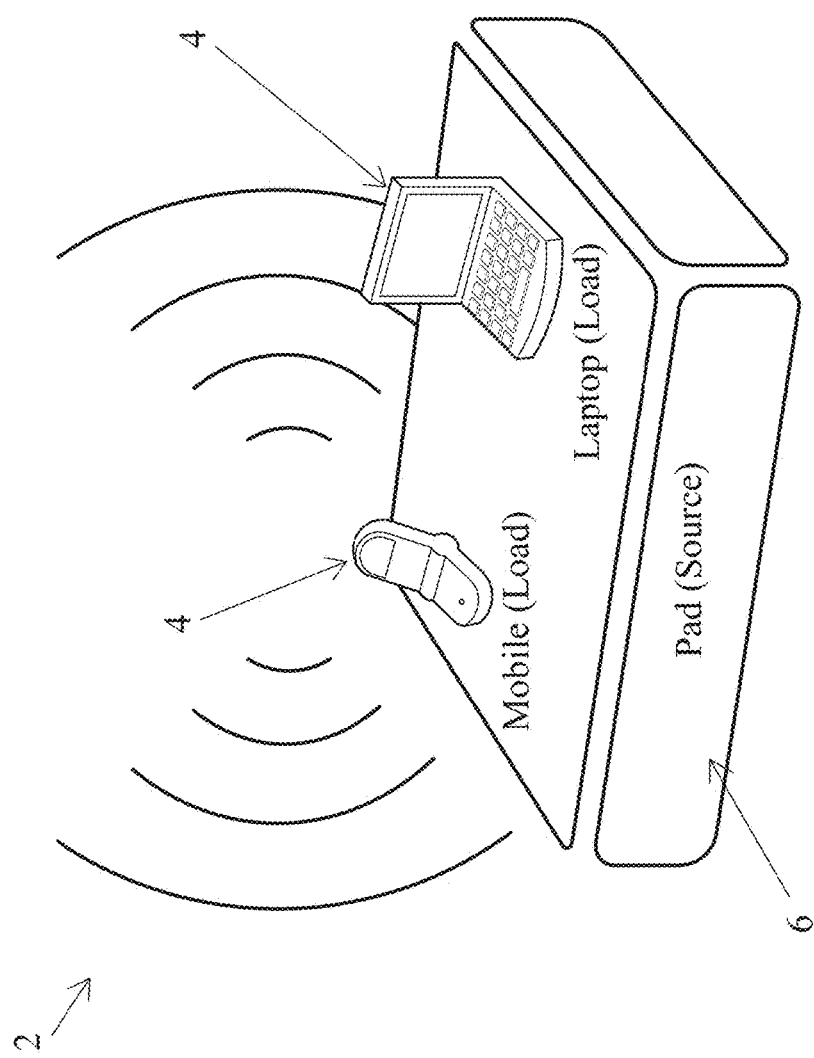
FIG. 1 is a schematic diagram illustrating the charger system.

FIG. 1 shows a wireless power transfer system that includes an in-band communication system 2. In-band communication system 2 has the benefit of being a lower cost solution compared to out-of-band solution. In-band communication allows: (1) Foreign object detection; (2) Power matched to load (vs. full TX power); (3) Power allocation per load; (4) Charger status available on phone; and (5) provisioning/billing.

Figure 2:
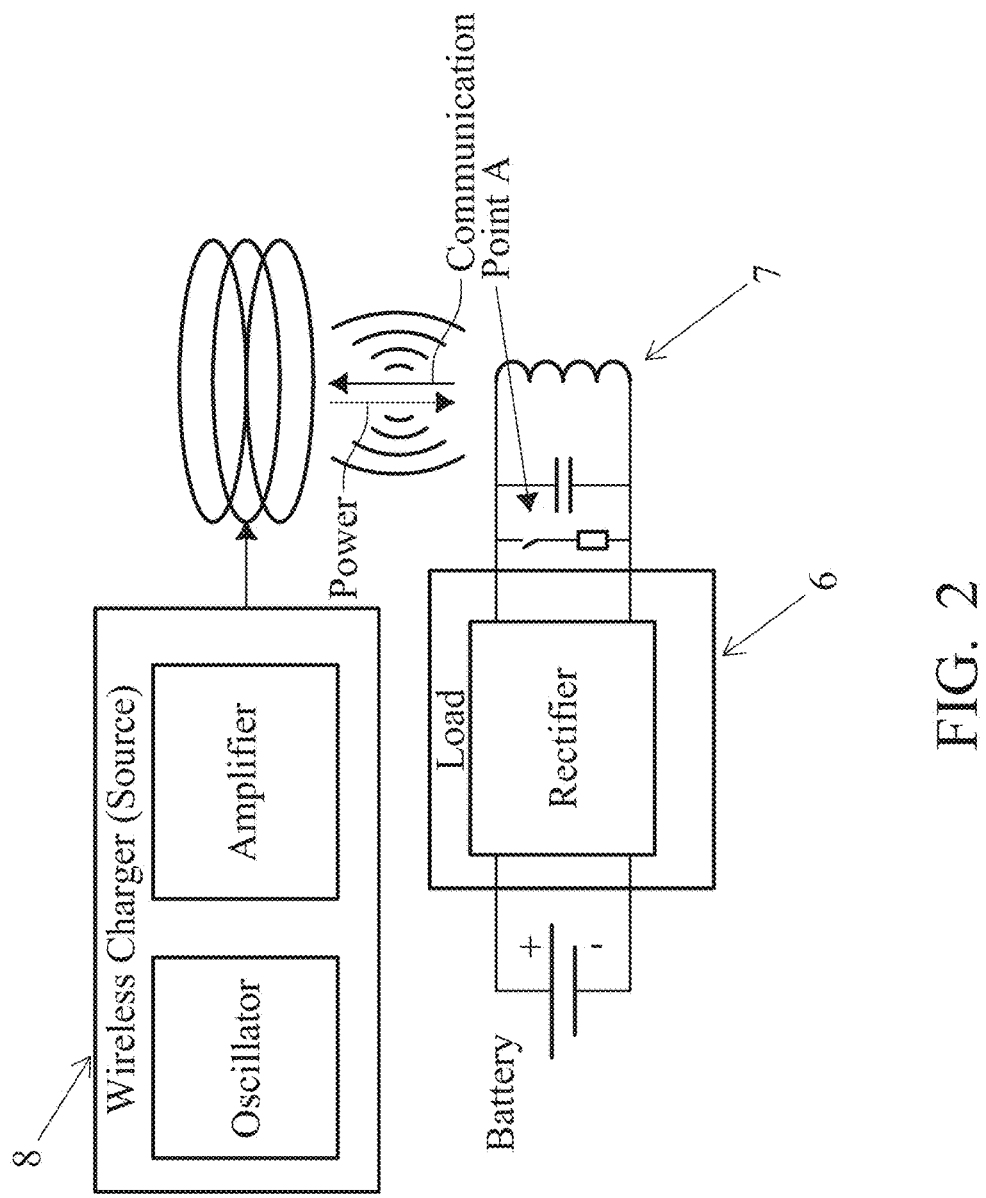
FIG. 2 is a schematic diagram illustrating the impedance variation for load to source communications.

The inventive wireless power transfer in-band communication system is different from systems currently on the market or proposed by other companies, as it uses a dedicated preamble synchronization method and channel coding for message error correction. In this topology the Load device 4 is required to communicate with the Source 8 to provide power control commands, status and foreign object detection information. It is possible by varying the reflected impedance of the Load 4 seen by the Source 8 to modulate a signal on the transmitted power waveform to facilitate communication between the Load and Source. FIG. 2 shows how the Load impedance 6 can be varied (Point A) to modulate the transmitted signal at the Source 8. The modulation component can be either capacitive or resistive.

Figure 3:
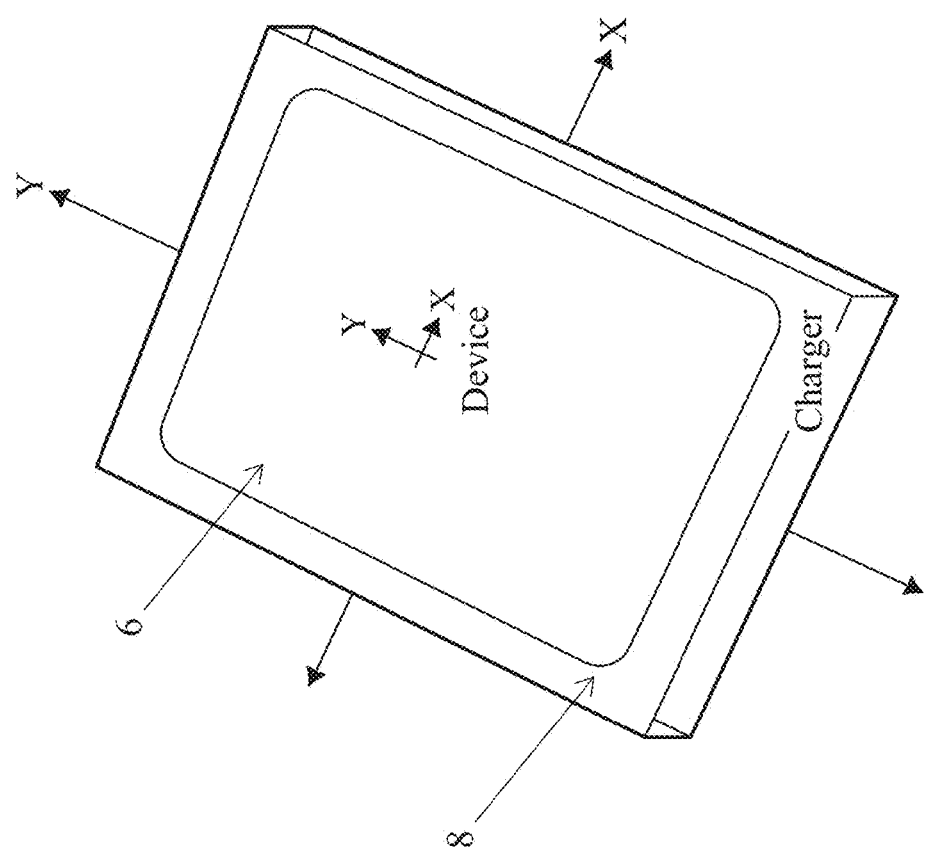
FIG. 3 is a schematic diagram illustrating a charger and device orientation of current available wireless charging topologies.

Note that the incumbent inductive wireless charging setups require that the device (Load) 6 is in a very specific orientation with the charger (Source) 8, as shown in FIG. 3. Both the close proximity and fixed orientation results in very benign wireless charger communication channel conditions—thus allowing a simple communications scheme.

The inventive wireless charging system can utilize a larger form factor to allow multiple devices to charge simultaneously. The inventive wireless charging system can have multiple devices with arbitrary orientation. The devices do not need to be in close proximity or have a fixed orientation. The arbitrary offset and position of the device results in very hostile in-band wireless charger communication channel conditions. This makes communication between Load and Source difficult.

Figure 4A:
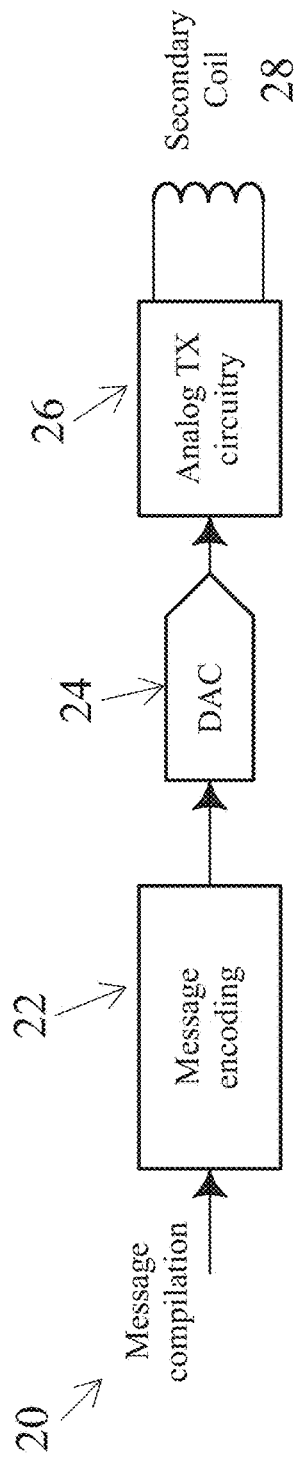
FIGS. 4A-4B are schematic diagrams illustrating the transmitting and receiving block diagrams used in accordance with the invention.
Figure 4B:
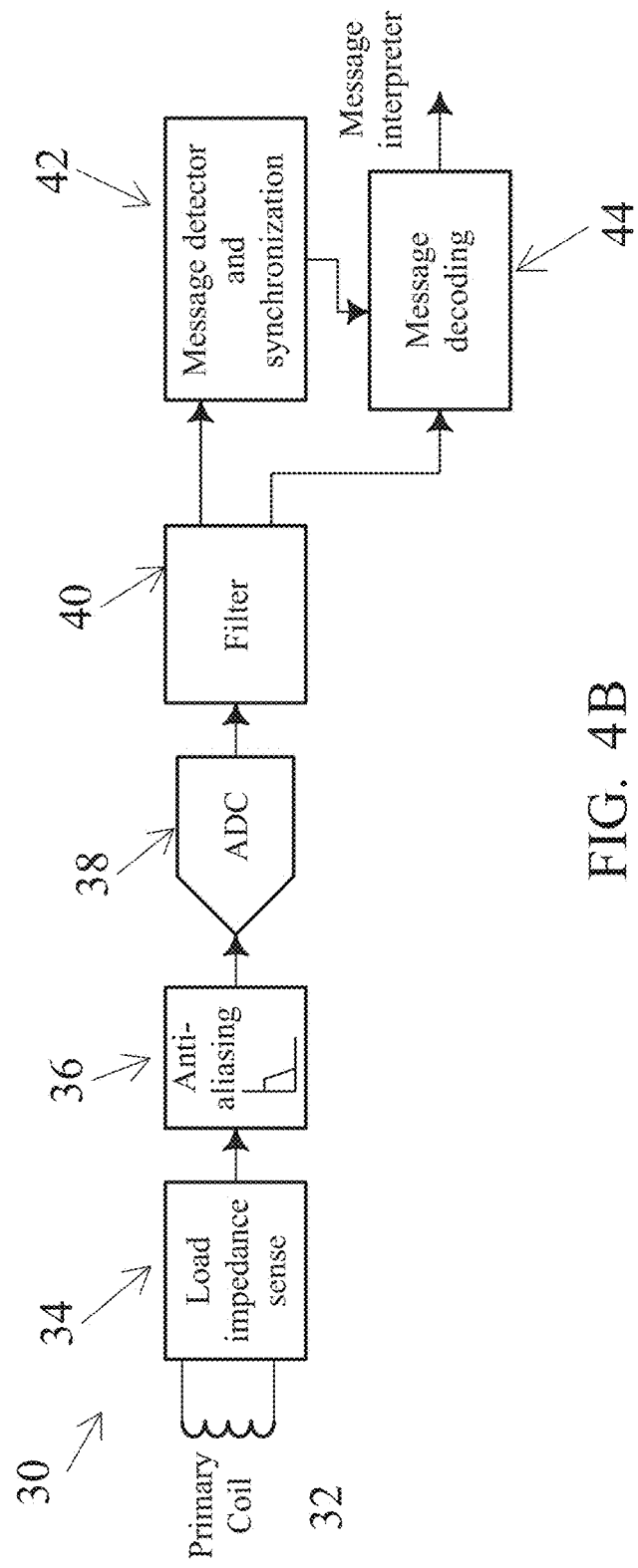

The communication system must have low complexity and be robust enough to ensure good communication between the Load (Transmitter) and the Source (Receiver). Complexity is an important factor as both the communication transmission and reception must be able to be implemented on relatively simple MCUs. FIG. 4A and FIG. 4B shows the block diagrams of the transmission and reception paths. In particular, FIG. 4A shows a message being received by a message encoding module 22. The message encoding module 22 performs the necessary encoding routines to prepare a message for transmission. The message encoding module 22 sends the encoded message to a digital to analog converter (DAC) 24 for processing. The DAC 24 converts the encoded message into an analog signal for transmission. The DAC 24 sends the analog signal to an analog TX circuitry 26 by varying the impedance of the Load seen by the Source. A simple method could replace the DAC 24 with a switched impedance. The analog TX circuitry 26 includes all elements, such as a secondary coil 28, needed to transmit the analog signal to a receiver 30, as shown in FIG. 4B.

FIG. 4B shows the analog signal being received by a primary coil 32 and a load impedance sense module 34 to prepare the analog signal for decoding. The load impedance sense module 34 sends the analog signal to an anti-aliasing module 36. The anti-aliasing module 36 is used to prevent aliasing in the conversion of a continuous signal back to samples. The anti-aliasing module 36 sends the anti-aliased signal to an analog to digital converter (ADC) 38. The anti-aliased signal is converted to a digital signal and this digital is provided to a filter 40. The filter 40 is a high pass filter that removes any affiliated noise associated with the transmission of the analog signal. The filter 40 provides its output to the message detector and synchronization module 42 and message decoding module 44. The message detector and synchronization module 42 uses various synchronization schemes to synchronize the digital signal for decoding and provide its information to the message decoding module 44 to decode the digital signal accordingly.

The Resonant Wireless Power (RWP) Charger is supplied by a low voltage power supply that will typically be plugged into the wall outlet. When there is no Load device present the RWP Charger operates in standby mode which is a low power state. Every 200 ms the RWP Charger will 'wake up' and transfer a minimum amount of power for any Load device in the vicinity to power up if required and commence charging. At this point the Load device will send power control commands to the Charger in the form of incremental changes in the reflected impedance presented to the Charger. When the RWP Charger receives power control commands it uses power control algorithms, including multiple device considerations if necessary, to set the appropriate power level.

There are two variations of the inband communication scheme that can be used in the RWP charger: (1) Synchronous with a low data rate—typical bit rate of 2 kbps; and (2) Random access with a low data rate—typical bit rate of 4 kbps.

The Load devices only transfer power management information to the RWP Charger such as power up or down requests; the power received and highlights of a fault condition. The RWP Charger receives messages from all receivers and arbitrates requests to provide the best possible user experience. A Load device will limit any potential excessive received coil voltage through voltage limiting techniques.

When all Load devices are fully charged or removed from the charging area the RWP Charger returns to standby mode. If the device entering the field is not a valid receiver, the RWP Charger identifies it as such and reverts to standby mode.

The RWP Charger provides message synchronization and co-ordination, and message acknowledgments to the Loads by way of incremental changes in power provided to the Loads. Synchronization markers are transmitted from the Charger to the Load(s) at regular intervals so that the Load(s) can send power management status and power change request messages to the Charger and minimize the possibility of message collisions with other Load devices on the charging pad. One method of synchronization can be achieved through incremental power increases or decreases to the Load. The inband communication uses the same 6.78 MHz AC magnetic field that is used for power transfer. No secondary frequency is used. The wireless charging system is designed so that the Load device is required to be placed in contact with the surface of the charging pad operating in the near field. At worst case the Load device must be within 4 cm of the charging pad surface. This meets the requirement that the RF energy is locally generated and used. The radiated emissions of the RWP Charger are in line with the radiated emissions as described earlier.

Figure 5:
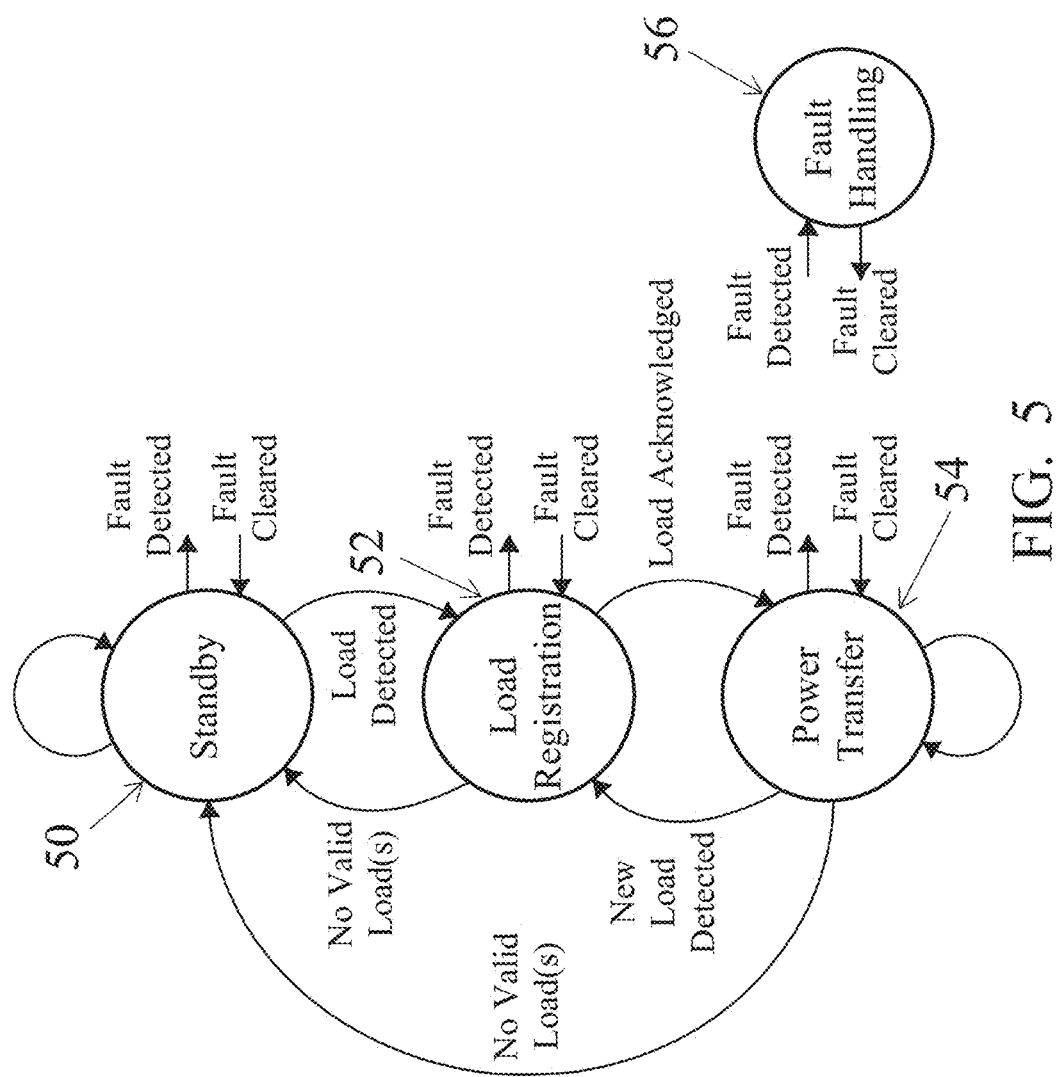
FIG. 5 is a schematic block diagram illustrating the synchronous phases of power transfer used in accordance with the invention.

For the synchronous inband communication the power transfer behavior can be separated into four distinct phases, as shown in FIG. 5.

When the Charger powers up or when no load devices are detected, the Charger enters a low power standby mode 50. During standby mode 50 the Charger will strobe periodically to detect the presence of a Load. The power level supplied by the Charger during strobe mode will be sufficient to power the control and communications circuitry on the Load.

During strobe mode the Charger power is compared to an expected no-load power. If there are load devices in the charging field when the Charger is powered up, it will immediately detect their effect on the power during strobe mode and proceed to the load registration phase 52.

The load registration phase 52 is used by the power control algorithms to manage the power supplied to multiple devices. During the registration phase, load devices send registration messages to the Charger until they receive an ID number from the Charger.

In the power transfer phase 54, the Charger is responsible for listening for messages from registered and unregistered Loads, and detecting fault conditions. The Charger responds to messages from registered devices by stepping up or stepping down power. In the power transfer phase, the Loads are responsible for sending a status message to show their present status and received power.

The Charger maintains a registry of all valid Load devices in the field. A Load device can enter the registry by successfully completing the registration phase. A Load device is removed from the registry if it fails to send a status packet within a specific period of time.

The Charger also takes measurements periodically of the power that it is delivering to its Charger coil. This power can be measured using a current and voltage sense at the input to the Charger amplifier. This power is compared to the sum of the reported received powers from all Load devices. When the Charger power exceeds the total of the reported received powers by greater than a selectable margin, a foreign-object-detection (FOD) fault condition results.

The Charger keeps a record of the last few states and takes action if limit-cycling behavior occurs. For example, the Charger may encounter a situation in which one Load requests more power in one cycle, but the resulting increase in power causes another Load to request less power. After this pattern repeats a few times, the Charger will recognize that limit cycling has occurred and choose an appropriate state to operate in.

If the Charger detects a fault during the power transfer phase, it exits to the fault handling mode 56. The most common type of fault is expected to be a foreign-object-detection (FOD) fault. Additional faults could be generated by the Charger in response to a coil over voltage, or over current condition or an over temperature event. Each type of fault has a programmed timeout period. When the fault occurs, the Charger power path shuts down for the corresponding timeout period. An error condition is indicated to the user during this time (e.g.an LED). After the timeout period expires, the Charger goes into the standby state and attempts to re-initialize power transfer to the devices in the charging field.

In addition to managing power requests from Load devices, the Charger is responsible for distinguishing valid loads from foreign objects that absorb wireless power. The method for doing this is to keep a continuous account of the power delivered to all devices in the charging field as reported to the charger by each Load and to compare this account to the power delivered into the Charger amplifier. If the discrepancy between these two figures exceeds a preset limit, the Charger infers that a foreign object is present and shuts down.

For the random access method of communication the RWP Charger does not provide any message synchronization, message co-ordination or message acknowledgments. The Load devices send messages randomly within a local window to the RWP Charger. A typical window size is 0.25 s. There is no explicit registration procedure used for the random access method. Using this method there is a possibility of message collisions with other Load devices on the charging pad. However due to the random position of message transmission for each device, the information that is being transferred for each load device has a high probability of being received successfully within a few window periods (0.25 s). For example breaking the Target window into slots approximately the length of the message (15 ms) gives 16.667 slots per window. Taking two Target devices in the simplistic case where their time windows are aligned the probability of collision is ~6.25%. Again assuming the simplistic case where Target devices and Source are time aligned the probability of collisions for two devices across 4 target device window periods (1 s) is 22.75%.

Figure 6:
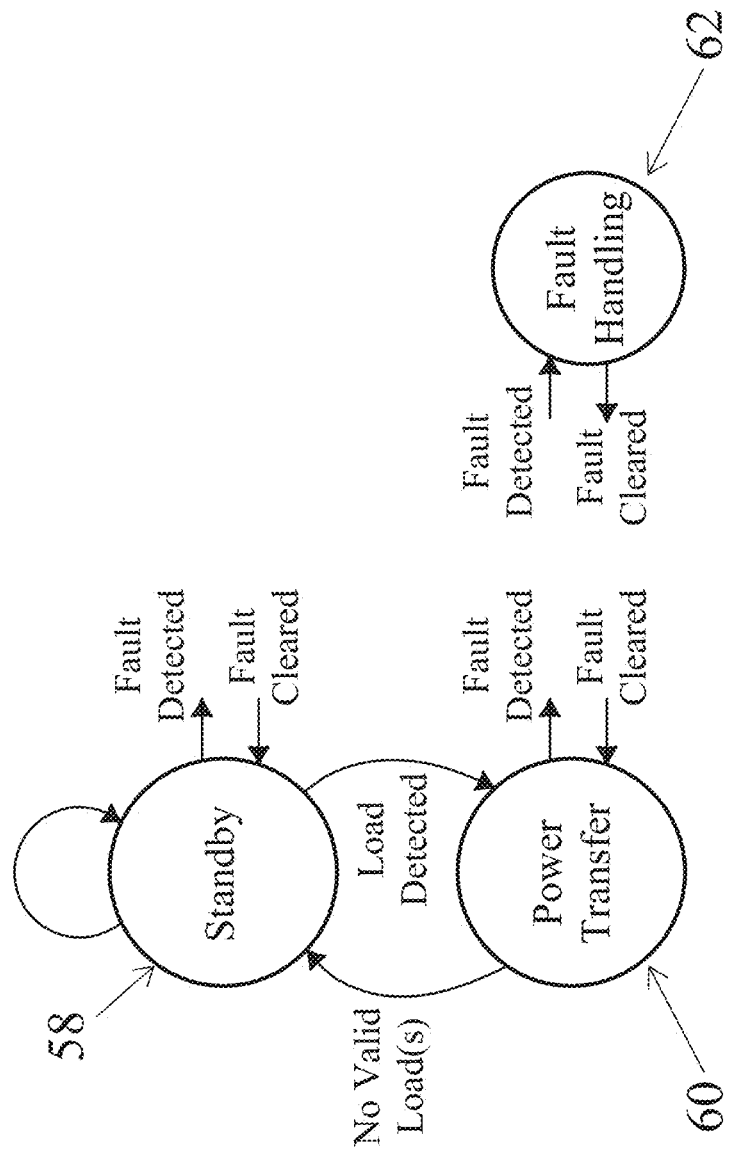
FIG. 6 is a schematic diagram illustrating the random access phases of power transfer.

For the random access inband communication the power transfer behavior only has three phases, as shown in FIG. 6.

The random access mode standby phase 58, power transfer phase 60, and fault handling phase 62 is similar to that of the synchronous method without Load device registration. The Charger responds to messages from any Load device present on the charging pad. Using the random access communication method the Loads are still responsible for sending status messages to show their present status and received power.

In random access mode the power measurement and reporting windows between Target and Source devices are independent. By using random access communication from the Target to the Source it is not possible for Target devices to negotiate a unique device identification with the Source. As a consequence it is not possible for the Source device to determine which message belongs to which Target device, or if an equal number of reported power measurements have been received from each Target device during a measurement accumulation window.

Figure 7:
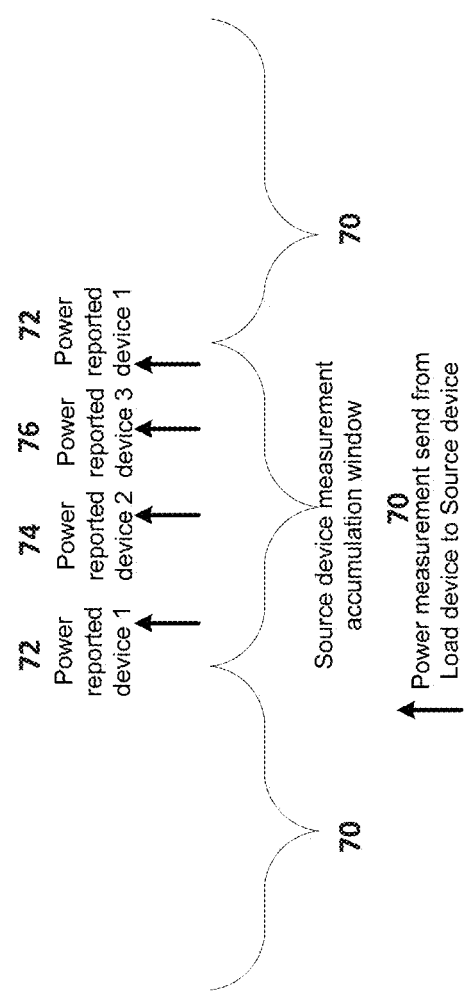
FIG. 7 is a schematic diagram illustrating a Source device power measurement window.

FIG. 7 shows an example where Target device 1 has transmitted two power measurement reports 72 in a measurement accumulation window 70 and the rest of the Target devices have only transmitted one power measurement report, 74, 76. If the Source device was to use all of the power measurement reports during this measurement window—including two from Target device 1—then an incorrect total received power would be calculated. This may cause an erroneous fault condition to occur where a foreign object is indicated where none is present. The same behavior can also cause a foreign object to go undetected.

Figure 8:
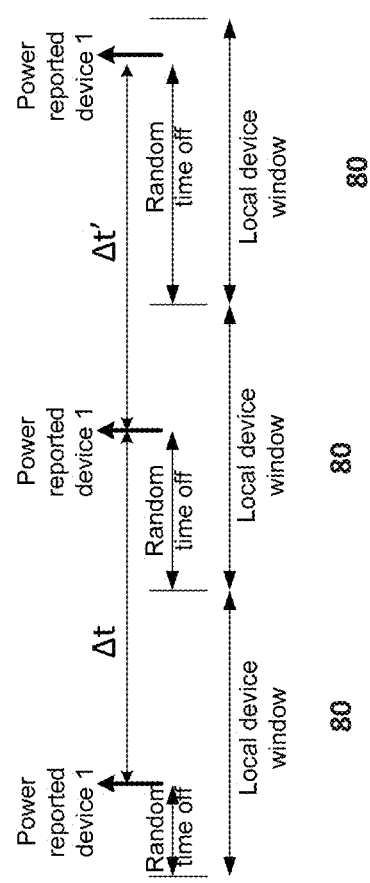
FIG. 8 is a schematic diagram illustrating a Target device energy report mechanism for a single Target device
Figure 9A:
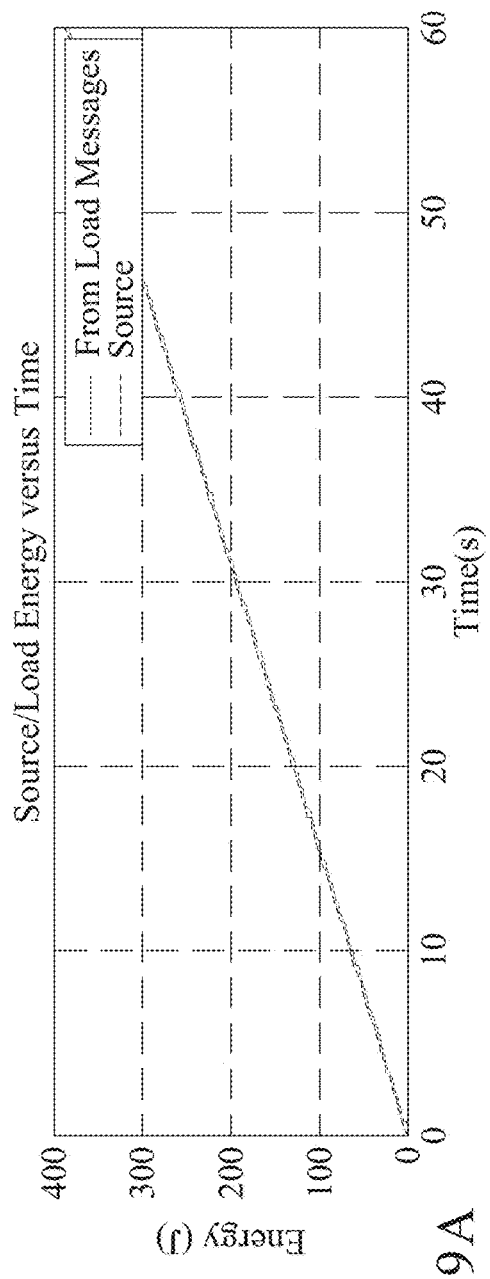
FIGS. 9A-9B are graphs illustrating the accumulated energy from two devices and power calculated across the Source measurement window
Figure 9B:
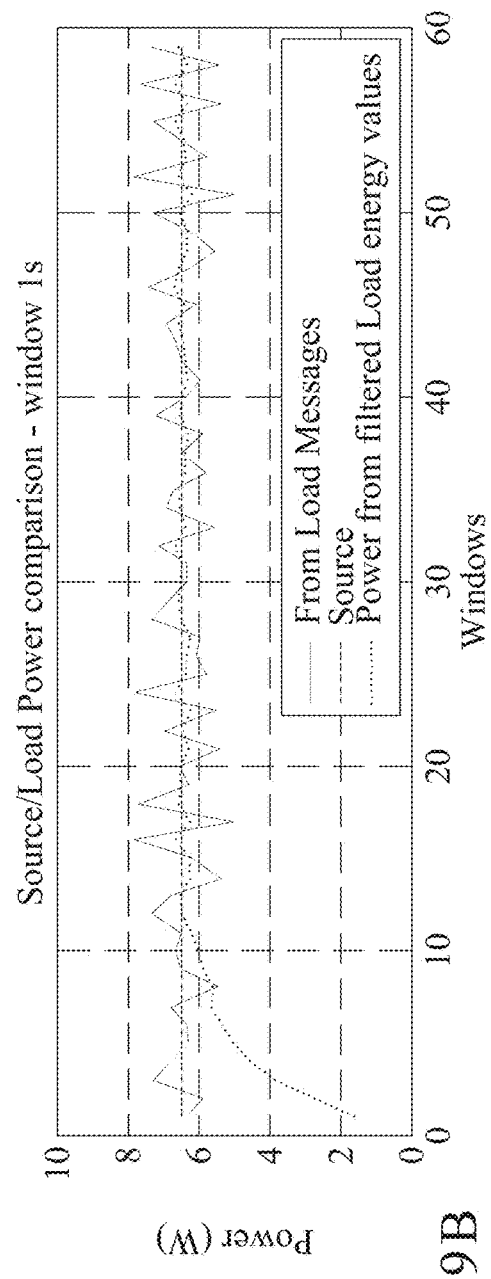
Figure 10A:
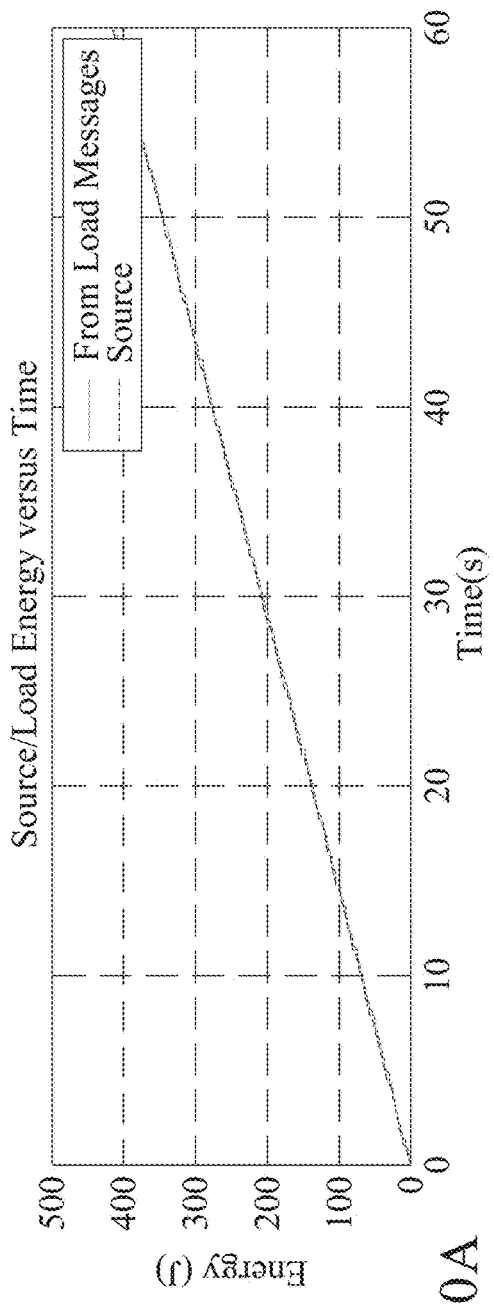
FIGS. 10A-10B are graphs illustrating the accumulated energy from two devices and power calculated across the Source measurement window.
Figure 10B:
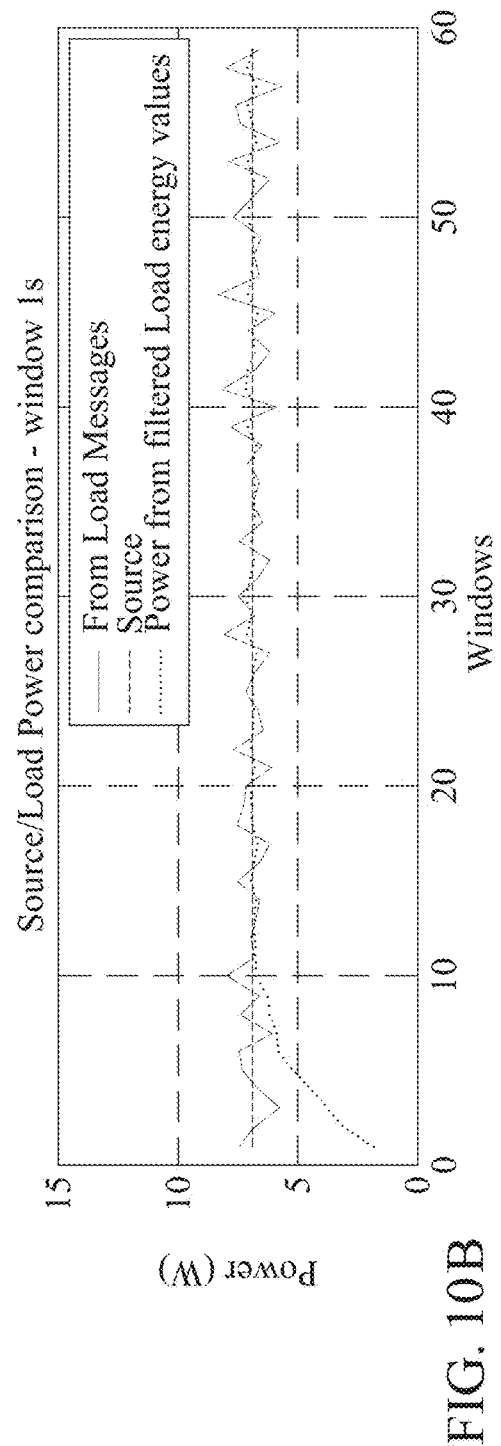

This problem can be mitigated by changing the contents of the power measurement report from power to energy. Instead of the Target sending the power received it sends the energy received since the last message was sent. This is shown in FIG. 8. Note the $\Delta t(s)$ shown in FIG. 8 do not need to be the same length.

$$\text{EnergyTarget} = \text{PowerTarget} \times \Delta t \qquad (1)$$

The Source maintains an accumulation of all of the energy received by the Targets within the measurement accumulation window. Note that the measurement accumulation window does not need to be the same length as the local device window 80 used by the Target devices. Usually the measurement accumulation window would be longer than the local device window 80. Typical values would be 250 ms for the local device window and 1 s for the measurement accumulation window.

$$\text{EnergyRX} = \Sigma \text{ EnergyTarget}, n, \text{ for all Targets}, n \qquad (2)$$

The Source can then differentiate the energy received during the measurement accumulation window from all of the Targets and compare this to the power transmitted by the source.

This system works without Target device identification and also works for multiple Target devices.

Note that it is also beneficial to low pass filter the received energy reported from the source devices.

Figure 11:
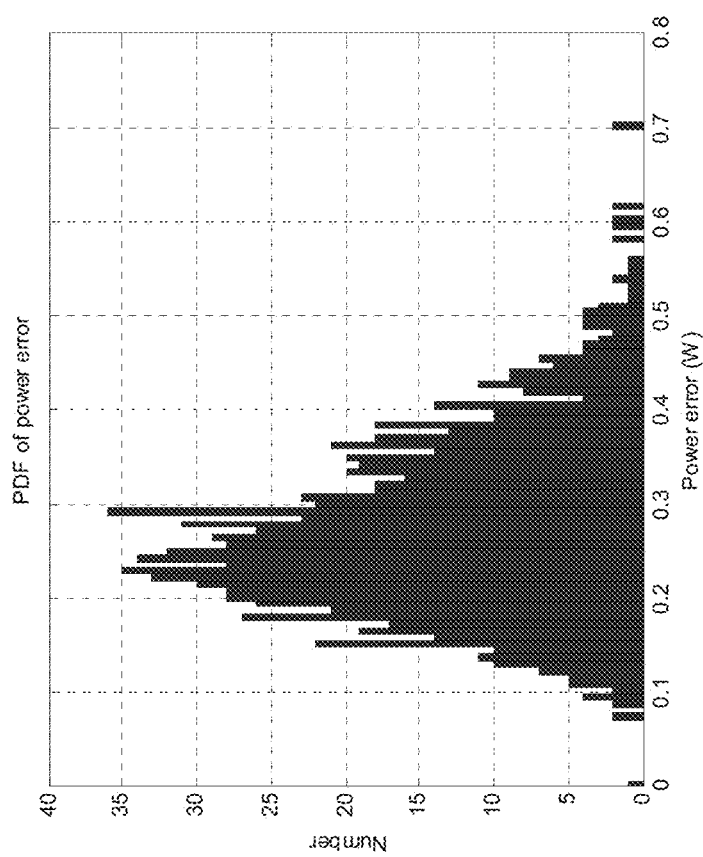
FIG. 11 is a power spectral density function of the power error using low pass filtered energy values reported from a two Target device scenario.

FIGS. 9A-9B and FIG. 10A-10B show the energy power calculated from filtered and unfiltered energy values reported from Target devices. FIG. 11 shows the PDF of the power error using low pass filtered energy values reported from two Target devices. Inband communication is an important element of the wireless charging operation and is used solely for power management including closed loop power control, Load and foreign-object detection.

Detection that the object on the charging pad is a valid Load helps in the following ways: (1) Optimizing the amount of power transferred to a valid Load device and delivering only the power required—efficient energy delivery; (2) Minimization of power consumption when no Load device is present. The low power consumption during standby mode of the RWP Charger makes it an environmentally friendly device with efficient energy usage; and (3) Safety—where foreign objects are detected and emitted power is minimized (effectively switched off).

Although the present invention has been shown and described with respect to several preferred embodiments thereof, various changes, omissions and additions to the form and detail thereof, may be made therein, without departing from the spirit and scope of the invention.

What is claimed is:

1. A wireless charging apparatus comprising:
 a charger portion configured to wirelessly charge one or more portable devices, the charger portion being configured to control an amount of power provided to charge the one or more portable devices; and
 an communication module configured to receive communications from the one or more portable devices using a random access mode, wherein the communications from the one or more portable devices using the random access mode are unsynchronized and do not include identification information of the one or more portable devices,
 wherein the charger portion is configured to receive energy information from the one or more portable devices identifying an amount of energy transferred to the one or more portable devices, and to determine how much power is needed to charge the one or more portable devices using the energy information.

2. The wireless charging apparatus of claim 1, wherein the charger portion is configured to operate in a plurality of processing stages for power management.

3. The wireless charging apparatus of claim 2, wherein the processing stages comprise a standby stage that powers up the charger portion for detecting one of the one or more portable devices.

4. The wireless charging apparatus of claim 2, wherein the processing stages comprise a power stage that listens for messages from one or more unregistered portable devices and detects fault conditions.

5. The wireless charging apparatus of claim 4, wherein the processing stages comprise a faulting handling stage that handles the fault conditions received from the power stage.

6. A method of performing wireless charging of one or more portable devices by a charger portion configured to control an amount of power provided to charge the one or more portable devices, the method comprising:
 receiving, by an communication module of the charger portion, communications from the one or more portable devices using a random access mode,
 wherein the charger portion is configured to utilize the communications to determine how much power is needed to charge the one or more portable devices,
 wherein the communications from the one or more portable devices using the random access mode are unsynchronized, do not convey identification information, and comprise one or more reports of the energy received by the one or more portable devices.

7. The method of claim 6, wherein the charger portion is configured to operate in a plurality of processing stages for power management.

8. The method of claim 7, wherein the processing stages comprise a standby stage that powers up the charger portion for detecting one of the one or more portable devices.

9. The method of claim 7, wherein the processing stages comprise a power stage that listens for messages from one or more unregistered portable devices and detects fault conditions.

10. The method of claim 9, wherein the processing stages comprise a faulting handling stage that handles the fault conditions received from the power stage.

* * * * *

UNITED STATES PATENT AND TRADEMARK OFFICE
CERTIFICATE OF CORRECTION

PATENT NO. : 9,837,848 B2
APPLICATION NO. : 14/771568
DATED : December 5, 2017
INVENTOR(S) : Timothy Perrin Fisher-Jeffes et al.

It is certified that error appears in the above-identified patent and that said Letters Patent is hereby corrected as shown below:

In the Claims

At Column 7, Claim 1, Line 25 and at Column 8, Claim 6, Line 16, the words "an communication" should read --a communication--.

Signed and Sealed this
Twelfth Day of June, 2018

Andrei Iancu
*Director of the United States Patent and Trademark Office*